US011387714B2

(12) United States Patent
Patel et al.

(10) Patent No.: US 11,387,714 B2
(45) Date of Patent: Jul. 12, 2022

(54) ROTATING RECTIFIER ASSEMBLIES, GENERATORS HAVING ROTATING RECTIFIER ASSEMBLIES, AND METHODS OF MAKING ROTATING RECTIFIER ASSEMBLIES

(71) Applicant: Hamilton Sundstrand Corporation, Charlotte, NC (US)

(72) Inventors: Dhaval Patel, Loves Park, IL (US); Andrew R. Wilkinson, Cherry Valley, IL (US); Edward C. Allen, Davis, IL (US); Duane C. Johnson, Beloit, WI (US); Kyle S. Sirbasku, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 212 days.

(21) Appl. No.: 16/791,680

(22) Filed: Feb. 14, 2020

(65) Prior Publication Data
US 2021/0257887 A1 Aug. 19, 2021

(51) Int. Cl.
*H02K 11/04* (2016.01)
*H02K 11/042* (2016.01)
*H02K 15/00* (2006.01)
*H02M 7/00* (2006.01)

(52) U.S. Cl.
CPC ......... *H02K 11/042* (2013.01); *H02K 11/046* (2013.01); *H02K 15/00* (2013.01); *H02M 7/003* (2013.01)

(58) Field of Classification Search
CPC ...... H02K 11/00; H02K 11/04; H02K 11/042; H02K 11/046; H02K 15/00; H02M 7/00; H02M 7/003; H01L 25/00; H01L 25/11; H01L 25/112; H01L 363/126; H01L 363/144; H01L 363/145; H01L 363/67
See application file for complete search history.

(56) References Cited

U.S. PATENT DOCUMENTS

| 5,773,903 A * | 6/1998 | McCabria | H02K 11/042 257/288 |
|---|---|---|---|
| 5,796,196 A * | 8/1998 | Johnsen | H01L 25/112 257/E25.025 |
| 2006/0176720 A1 | 8/2006 | Lemmers, Jr. et al. | |
| 2008/0197727 A1 | 8/2008 | Dubuc et al. | |
| 2010/0283357 A1 * | 11/2010 | Lemmers, Jr | H02K 11/042 310/68 D |
| 2014/0210320 A1 | 7/2014 | Wirsch, Jr. et al. | |
| 2018/0316248 A1 | 11/2018 | Patel et al. | |
| 2018/0320583 A1 | 11/2018 | Sasaki et al. | |

OTHER PUBLICATIONS

European Search Report Issued in European Application No. 21155018. 1-1202 dated Jul. 19, 2021; 7 Pages.

* cited by examiner

*Primary Examiner* — Tran N Nguyen
(74) *Attorney, Agent, or Firm* — Cantor Colburn LLP

(57) ABSTRACT

A rectifier assembly includes a terminal arranged along an assembly axis, a mounting ring axially offset from the terminal and seating a diode, a bus bar received within the mounting ring and electrically connecting the diode to the terminal through the bus bar, and a mounting ring. The mounting ring insulator receives the bus bar, is axially offset from the mounting ring, and contains an insert. The insert fixes the bus bar to the mounting ring insulator and compressively fixing the diode within the mounting ring. Generators and methods of making rectifier assemblies for generators are also described.

18 Claims, 8 Drawing Sheets

ROTATING RECTIFIER ASSEMBLIES, GENERATORS HAVING ROTATING RECTIFIER ASSEMBLIES, AND METHODS OF MAKING ROTATING RECTIFIER ASSEMBLIES

BACKGROUND

The present disclosure generally relates to power conversion, and more particularly to converting direct current (DC) power to alternating current (AC) power in electrical machines having wound rotors.

Rectifiers are commonly employed to convert AC power into DC power. For example, rectifiers may be used in conjunction with AC generators to convert and condition power so that it can be stored in a battery. Rotating rectifier assemblies, for example, can be used in brushless wound field synchronous generators to provide excitation power to the generator rotor.

Brushless wound field synchronous generators typically include a main machine and a brushless excitation system. The main machine produces the output power of the generator and includes a main armature (stator) and a main field (rotor). The main armature includes a three-phase winding. The main field includes a DC field winding which requires excitation voltage to create an electromagnet such that there are north-south pole pairs on the rotor. The main field rotates on the shaft and induces AC voltage using DC voltage applied to the main field, which is harvested as output power.

The brushless excitation system includes an exciter field (stator) and an exciter armature (rotor) and a rotating rectifier. The exciter field, similar to the main field, includes a winding that uses voltage to create an electromagnet. The exciter armature, similar to the main armature, includes a three phase AC winding. The exciter armature rotates on the shaft, such that when the exciter field is excited with DC voltage, an AC voltage is induced in the exciter armature. The rotating rectifier converts the AC voltage from the exciter armature to DC voltage. The DC voltage output from the rotating rectifier is applied to the main field. Such rectifiers are designed to rotate on the shaft with the exciter armature and the main field.

Rectifiers include a combination of diodes and a snubber circuit, which are electrically connected via bus bars and between an AC bus and a DC bus, so as to form a suitable rectifier circuit. The snubber circuit can include any series or parallel combination of resistors, capacitors and/or inductors to condition the voltage and current waveforms of the rectifier. The diodes, snubber circuit, and bus bars are typically embedded in recesses formed in an annular insulator ring. The insulator ring serves to electrically insulate the components, while providing structural support so as to maintain the position thereof. The bus bars, resistors, diodes, etc. are then fastened into place on the insulator ring. For example, the bus bars are fastened by screws on either end, with the screws also each fastening to a conductive spring. The springs, in turn, hold the diodes and resistors in place, while providing electrical connection with the bus bar. Each screw is threaded in from the inside diameter of the insulator ring outwards (i.e., "side inserted") into tapped holes formed in the insulator ring.

Such systems and methods have generally been acceptable for their intended purpose. However, there remains a need in the art for improved rotating rectifier assemblies, generators and methods of making rotating rectifiers.

BRIEF DESCRIPTION

A rectifier assembly includes a terminal arranged along an assembly axis, a mounting ring axially offset from the terminal and seating a diode, a bus bar received within the mounting ring and electrically connecting the diode to the terminal through the bus bar, and a mounting ring insulator. The mounting ring insulator receives the bus bar, is axially offset from the mounting ring, and contains an insert fixing the bus bar to the mounting ring insulator and compressively fixing the diode within the mounting ring.

In addition to one or more of the features described above, or as an alternative, further examples of the rectifier assembly may include that the insert has a female threaded body arranged within an intermediate annulus.

In addition to one or more of the features described above, or as an alternative, further examples of the rectifier assembly may include that the female threaded body is formed from a metallic material and defines a female threaded segment arranged to threadedly receive therethrough a fastener.

In addition to one or more of the features described above, or as an alternative, further examples of the rectifier assembly may include that the intermediate annulus is formed from a metallic material and has an outer surface defining an engagement feature, the engagement feature fixing the insert within an interior of the mounting ring insulator.

In addition to one or more of the features described above, or as an alternative, further examples of the rectifier assembly may include that the mounting ring insulator has a radially innermost outer surface and a radially outermost inner surface, wherein the insert is contained between the radially innermost outer surface and the radially outermost inner surface.

In addition to one or more of the features described above, or as an alternative, further examples of the rectifier assembly may include that the mounting ring insulator defines a tool aperture therethrough, and that the tool aperture is circumferentially offset from the insert about the assembly axis by about 180-degrees.

In addition to one or more of the features described above, or as an alternative, further examples of the rectifier assembly may include that the tool aperture extends between axially adjacent planar bus seat surfaces, the planar bus seat surfaces tangent to a circle extending about the assembly axis.

In addition to one or more of the features described above, or as an alternative, further examples of the rectifier assembly may include that the tool aperture is a first tool aperture and the mounting ring insulator define therethrough a second tool aperture and a third tool aperture, the second tool aperture circumferentially offset from the first tool aperture by about 120-degrees, the third tool aperture circumferentially offset from the first tool aperture by about 120-degrees.

In addition to one or more of the features described above, or as an alternative, further examples of the rectifier assembly may include that the insert is a first insert and the mounting ring insulator contains within its interior a second insert and a third insert, the second insert circumferentially offset from the first insert by 120-degrees, the third insert circumferentially offset from the first insert by 120-degrees.

In addition to one or more of the features described above, or as an alternative, further examples of the rectifier assembly further includes a fastener with a head portion and an opposite shank portion, the shank portion extending through the bus bar, the shank portion threadedly received within the insert, and the shank portion terminating at a location radially inward of a radially innermost outer surface of the mounting ring insulator.

In addition to one or more of the features described above, or as an alternative, further examples of the rectifier assembly may include that the head portion of the fastener is arranged on a side of the bus bar radially inward of a radially outermost inner surface of the mounting ring insulator.

In addition to one or more of the features described above, or as an alternative, further examples of the rectifier assembly may include an insulator body extending about the shank portion of the fastener and interposed between the bus bar and the head portion of the fastener.

In addition to one or more of the features described above, or as an alternative, further examples of the rectifier assembly may include a direct current pin electrically connected to the terminal by the diode, the direct current pin arranged radially outward of the insert and radially separated from the assembly axis by the fastener and the bus bar.

In addition to one or more of the features described above, or as an alternative, further examples of the rectifier assembly may include a fastener recessed within a radially innermost outer surface of the mounting ring insulator.

A generator is also provided. The generator includes a stator supporting a stator main coil and a rotor carrying a rectifier assembly as described above. The rotor is supported for rotation about a rotation axis, the mounting ring insulator has a radially innermost outer surface and a radially outermost inner surface, the insert is contained between the radially innermost outer surface and the radially outermost inner surface, and a fastener recessed within a radially innermost outer surface of the mounting ring insulator.

In addition to one or more of the features described above, or as an alternative, further examples of the generator may include that the insert is a first insert and the mounting ring insulator contains within its interior a second insert, that the rectifier assembly includes third insert, that the second insert circumferentially offset from the first insert by 120-degrees, the third insert circumferentially offset from the first insert by 120-degrees, and that the mounting ring insulator defines a tool aperture therethrough circumferentially offset from the insert about the assembly axis by about 180-degrees.

In addition to one or more of the features described above, or as an alternative, further examples of the generator may include that the insert has a female threaded body arranged within an intermediate annulus and that the fastener has a head portion and an opposite shank portion, the shank portion extending through the bus bar, the shank portion threadedly received within the insert, and the shank portion terminating at a location radially inward of a radially innermost outer surface of the mounting ring insulator.

In addition to one or more of the features described above, or as an alternative, further examples of the generator may include a direct current pin electrically connected to the terminal by the diode, the direct current pin arranged radially outward of the insert and radially separated from the assembly axis by the fastener and the bus bar.

A method of making a rectifier assembly is additionally provided. The method includes arranging a terminal along an assembly axis, connecting a mounting ring to the terminal at a location axially offset from the terminal, and seating a diode within the mounting ring. A bus bar is positioned within the mounting ring and electrically connects the diode to the terminal through the bus bar, a mounting ring insulator is connected to the mounting ring at a location axially offset from the mounting ring such that the bus bar is received within the mounting ring, and the bus bar fixed to an insert contained within the mounting ring insulator, wherein fixing the bus bar to the insert compressively fixes the diode within the mounting ring.

In addition to one or more of the features described above, or as an alternative, further examples of the rectifier assembly may include injection molding the mounting ring insulator about the insert such that the insert is contained within the mounting ring insulator.

Technical effects of the present disclosure include rotating rectifiers that are simple and relatively low-cost. Technical effects of the present disclosure also include rotating rectifiers that have relatively few parts and which are light-weight. Technical effects of the present disclosure additionally include rotating rectifiers having relatively high dielectric protection.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
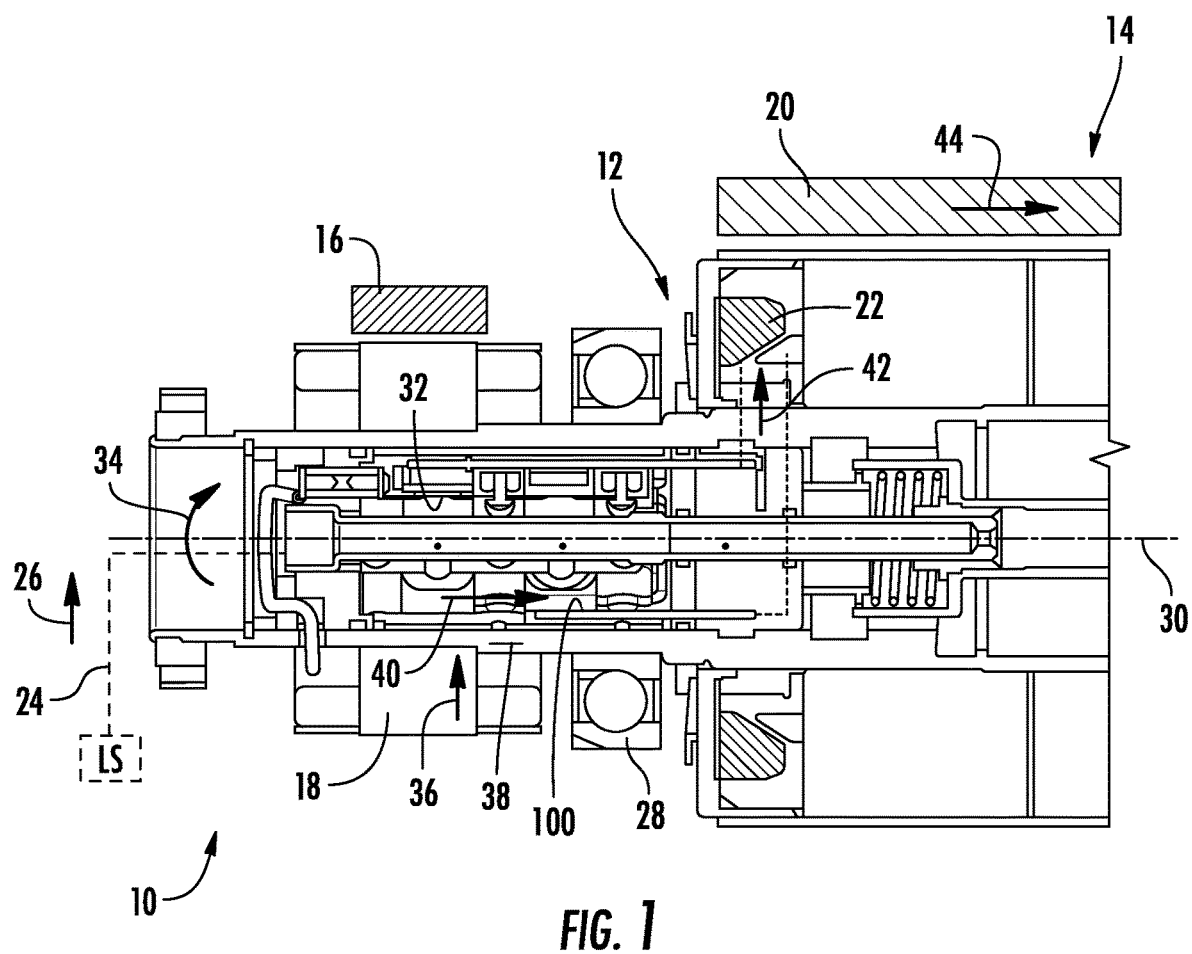
FIG. 1 is a cross-sectional view of a rectifier assembly constructed in accordance with the present disclosure, showing a generator with a rotor supported for rotating relative to a stator and carrying a rectifier assembly.

Reference will now be made to the drawings wherein like reference numerals identify similar structural features or aspects of the subject disclosure. For purposes of explanation and illustration, and not limitation, a partial view of an example of a rectifier in accordance with the disclosure is shown in FIG. 1 and is designated generally by reference character 100. Other examples of rectifier assemblies, generators having rotating rectifier assemblies, and methods of making rectifier assemblies are provided in FIGS. 2-10, as will be described. The systems and methods described herein can be used for rectifying alternating current (AC) power into direct current (DC) power, such as in rotating rectifiers in wound rotor electrical machines like generators, though the present disclosure is not limited to generators or to rectifying AC power in general.

With reference to FIG. 1, a generator 10 is shown. The generator 10 includes the rectifier assembly 100, a rotor 12, and a stator 14. The generator 10 also includes a stator exciter winding 16, a rotor exciter winding 18, a stator main coil 20, and a rotor main winding 22. The generator 10 further includes a lubricant circuit 24 with a lubricant 26 and a bearing arrangement 28.

The generator 10 supports the stator main coil 20, the stator exciter winding 16, and the bearing arrangement 28. The bearing arrangement 28 supports the rotor 12 for rotation about a rotation axis 30 for rotation relative to the stator 14. The rotor 12 carries the rotor exciter winding 18, the rotor main winding 22, and the rectifier assembly 100. The rectifier assembly 100 is fixed in rotation relative to the rotor 12, the rectifier assembly 100 being a rotating rectifier assembly in this respect, and electrically connects the rotor exciter winding 18 to the rotor main winding 22. The rectifier assembly 100 includes a rectifier circuit 32 formed from a plurality of diodes, e.g., first diodes 102 (shown in FIG. 3) and second diodes 104 (shown in FIG. 3), and a plurality of conductors, e.g., a source DC pin 106 (shown in FIG. 2), a return DC pin 108, an A-phase bus bar 110 (shown in FIG. 3), a B-phase bus bar 112 (shown in FIG. 3), and a C-phase bus bar 114 (shown in FIG. 6). In certain examples the rectifier circuit 32 is a three-phase full-wave bridge rectifier circuit having six (6) diodes, each phase having two (2) diodes, one (1) diode for each phase located on a separate mounting ring.

During operation a rotation source, e.g., a gas turbine engine, rotates 34 the rotor 12 about the rotation axis 30. As the rotor 12 rotates about the rotation axis 30 an excitation current 36 is communicated to the stator exciter winding 16. The excitation current 36 generates an exciter magnetic field 38, which induces an excitation current flow 40 in the rotor exciter winding 18 as the rotor exciter winding 18 rotates with the rotor 12 about the rotation axis 30. As will be appreciated by those of skill in the art, the excitation current flow 40 varies in frequency according to the rotational speed of the rotor 12.

The rotor exciter winding 18 communicates the excitation current flow 40 to the rectifier assembly 100. The rectifier assembly 100 rectifies the excitation current flow 40 to generate a DC excitation current flow 42 using the rectifier circuit 32, which the rectifier circuit 32 communicates to the rotor main winding 22. The rotor main winding 22 generates a magnetic field with the DC excitation current flow 42, which rotates with the rotor 12, and which induces a stator coil current flow 44 in the stator main coil 20. The stator coil current flow 44 is harvested from the stator 14 and communicated to electrical devices connected to the generator 10. It is contemplated that the excitation current flow 40 generate heat within circuit elements of the rectifier assembly 100 during rectification, and that the lubricant circuit 24 provide a flow of lubricant 26 to the rectifier assembly 100 to remove heat from the rectifier assembly 100.

Figure 2:
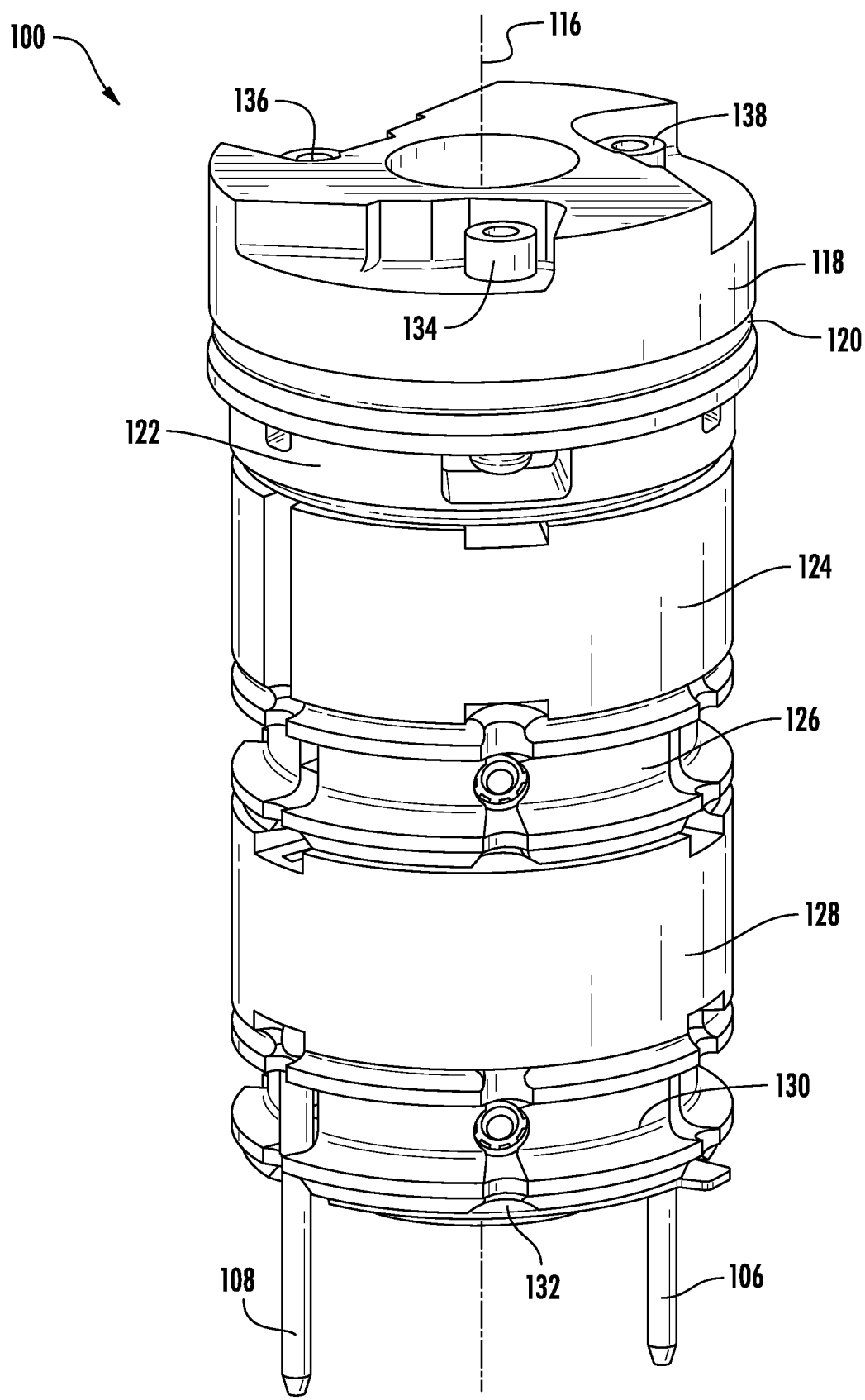
FIG. 2 is a perspective view of the rectifier assembly of FIG. 1, showing mounting rings and mounting ring insulators of the rectifier assembly axially stacked along an assembly axis.

With reference to FIG. 2, the rectifier assembly 100 is shown. The rectifier assembly 100 is arranged along an assembly axis 116 and includes an AC housing 118, a resilient member 120, an AC insulator 122, a first mounting ring 124, and a first mounting ring insulator 126. The rectifier assembly 100 also includes a second mounting ring 128, a second mounting ring insulator 130 and a base plate 132. The rectifier assembly 100 further includes the source DC pin 106, the return DC pin 108, an A-phase terminal 134, a B-phase terminal 136, and a C-phase terminal 138. It is contemplated that the rectifier assembly 100 be a rotating rectifier assembly arranged to be carried by a rotor, e.g., the rotor 12.

Figure 3:
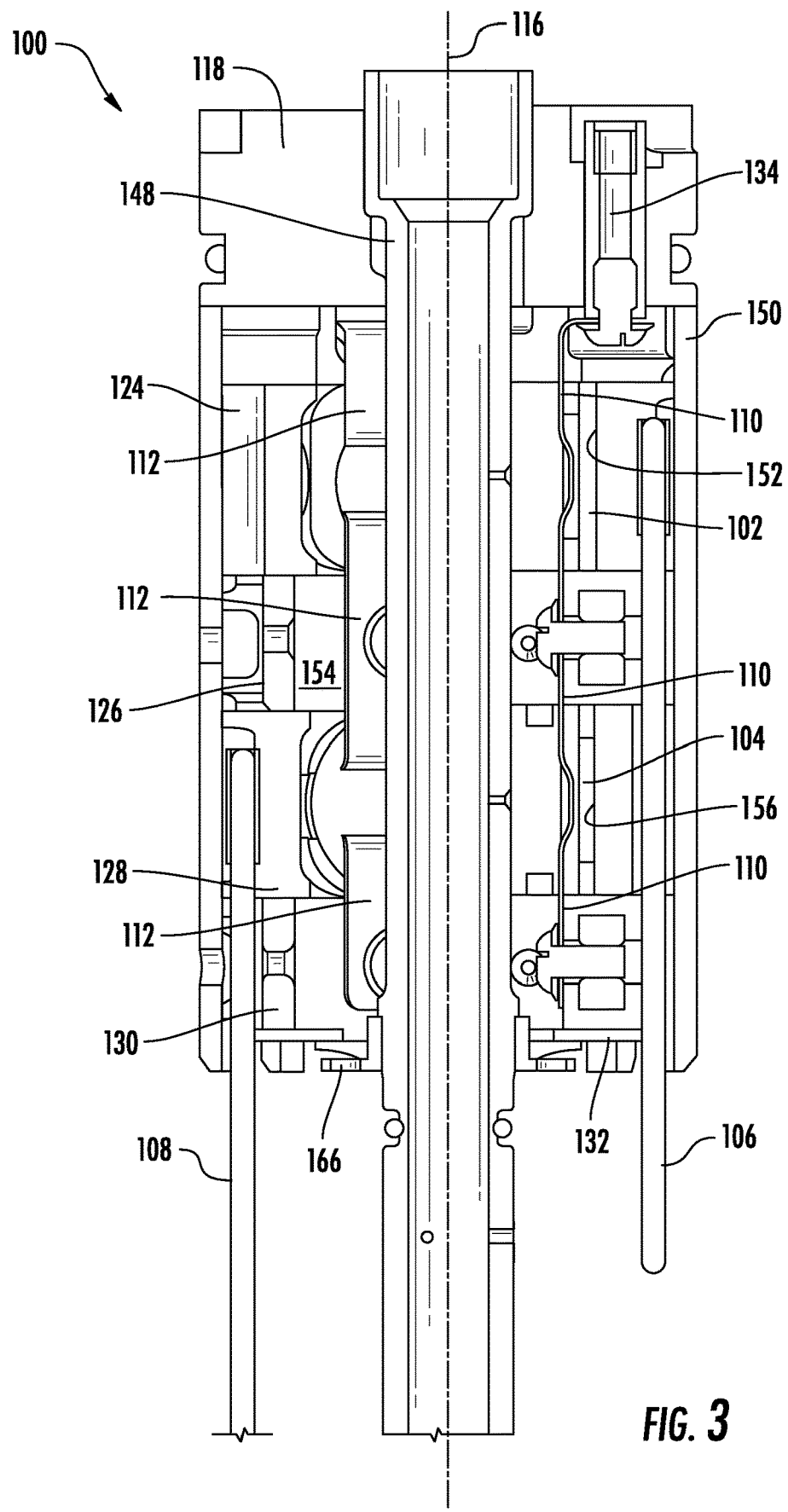
FIG. 3 is a cross-sectional side view of the rectifier assembly of FIG. 1, showing diodes seated in the mounting rings and a transfer tube extending the mounting rings and mounting ring insulators of the rectifier assembly.

The AC housing 118 is arranged along the assembly axis 116, extends about the assembly axis 116, and is arranged to receive therethrough a transfer tube 148 (shown in FIG. 3). Each of the A-phase terminal 134, the B-phase terminal 136, and the C-phase terminal 138 is seated within the AC housing 118 and arranged to connect electrically to the rotor exciter winding 18 (shown in FIG. 1) to receive the excitation current flow 40 (shown in FIG. 1). The resilient member 120 extends circumferentially about the AC housing 118 to provide fluid sealing between the AC housing 118 and DC housing 150 (shown in FIG. 3). It is contemplated that the A-phase terminal 134, the B-phase terminal 136, and the C-phase terminal 138 each be radially offset from the assembly axis 116 and circumferentially distributed about the assembly axis 116, e.g., on a circumferential pitch of about 120-degrees. In certain examples the rectifier assembly 100 is seated within the rotor 12 (shown in FIG. 1) such that the assembly axis 116 is co-linear with the rotation axis 30 (shown in FIG. 1).

Figure 6:
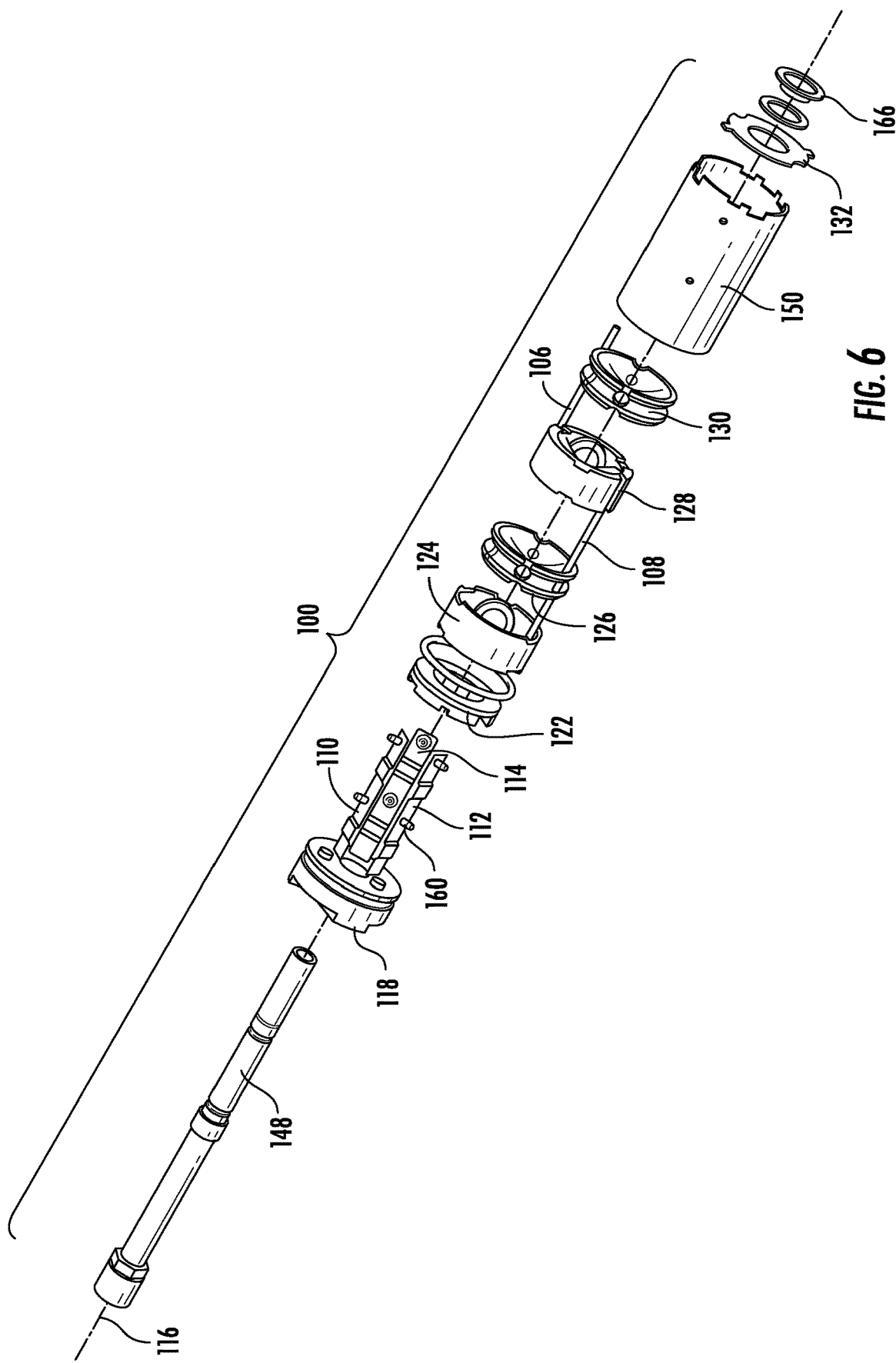
FIG. 6 is an exploded view of the rectifier assembly of FIG. 1, showing components of the rectifier assembly exploded along the assembly axis of the rectifier assembly.

With reference to FIGS. 2, 3 and 6, the AC insulator 122 is arranged along the assembly axis 116 and is axially stacked with the AC housing 118. More specifically, the AC insulator 122 extends about the assembly axis 116 and is axially stacked between the AC housing 118 and the first mounting ring 124. As shown in FIG. 3, the AC insulator 122 receives therethrough the transfer tube 148 such that the transfer tube 148 can fluidly communicate with the interior 154 of the rectifier assembly 100. It is contemplated that the AC insulator 122 be formed from an electrically insulative material to electrically separate the AC housing 118 from the first mounting ring 124.

The first mounting ring 124 is arranged along the assembly axis 116 and is axially stacked with the AC insulator 122. More specifically, the first mounting ring 124 extends about the assembly axis 116, is axially stacked between the AC insulator 122 and the first mounting ring 124, and receives the A-phase bus bar 110, the B-phase bus bar 112, and the C-phase bus bar 114. As shown in FIG. 3, the first mounting ring 124 defines a plurality of radially extending first mounting ring diode seats 152 seating therein first diodes 102. The first mounting ring 124 also receives the transfer tube 148 and extends about the transfer tube 148 such that the transfer tube 148 can fluidly communicate with the interior 154 of the rectifier assembly 100. It is contemplated that the first mounting ring 124 be formed from an electrically conductive material.

Figure 4:
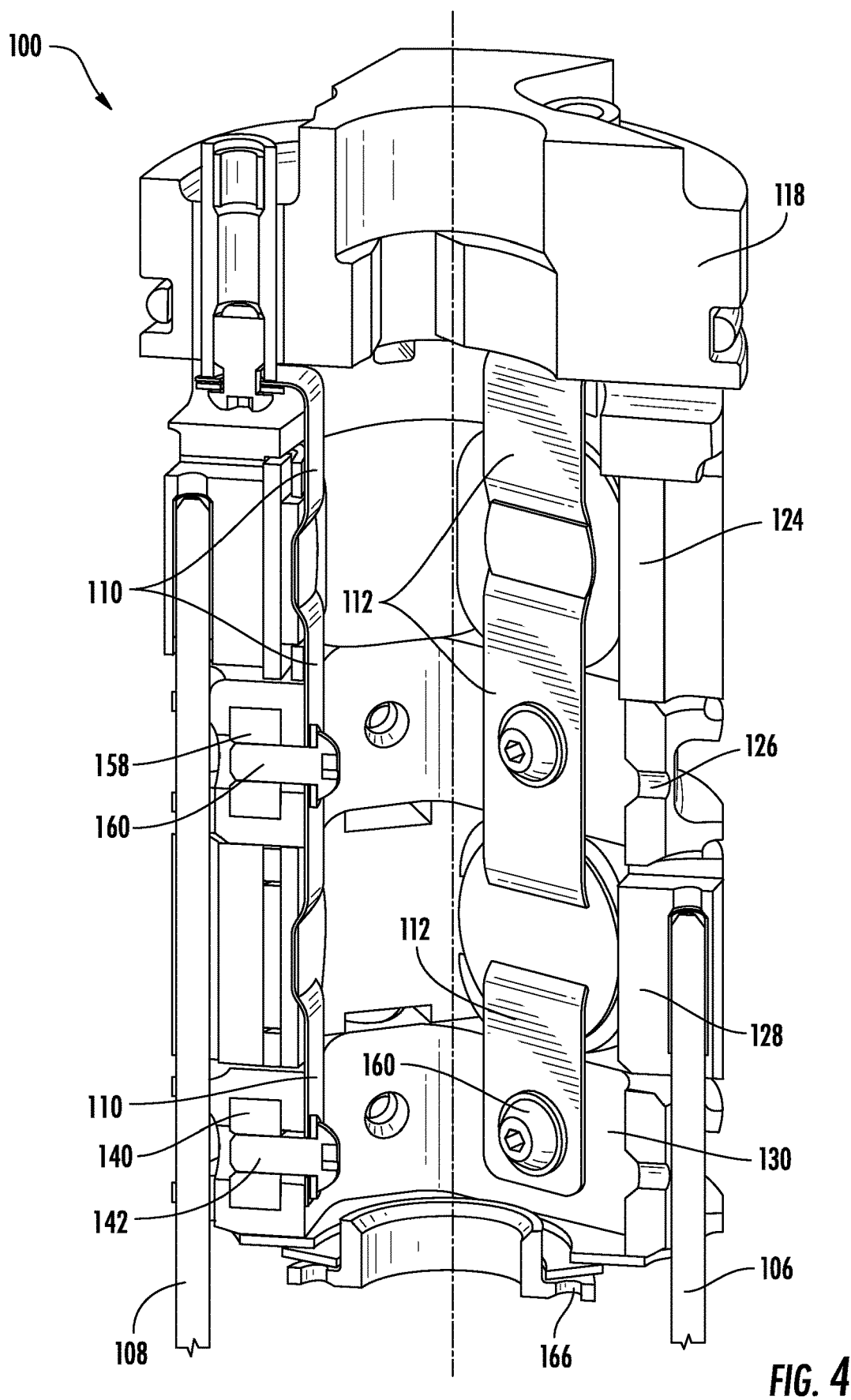
FIG. 4 is cross-sectional view of the rectifier assembly of FIG. 1 with the transfer tube removed, showing bus bars extending through the mounting rings and electrically connected to the diodes.

The first mounting ring insulator 126 is arranged along the assembly axis 116 and is axially stacked with the first mounting ring 124. As shown in FIG. 4, the first mounting ring insulator 126 extends about the assembly axis 116 and is axially stacked between the first mounting ring 124 and the second mounting ring 128. As shown in FIG. 3, the first mounting ring insulator 126 supports the AC bus bars, i.e., the A-phase bus bar 110, the B-phase bus bar 112, and the C-phase bus bar 114, with an insert, e.g., an insert 158 (shown in FIG. 5), contained within the first mounting ring insulator 126.

As shown in FIG. 4, the insert 158 receives therein a fastener 160, the fastener 160 fastening a bus bar segment 110A of the A-phase bus bar 110 to the first mounting ring insulator 126 and compressively fixing the first diodes 102 and the second diodes 104 within the first mounting ring diode seats 152 and the second mounting ring diode seats 156, respectively. It is contemplated that the first mounting ring insulator 126 be formed from an electrically insulating material, such as a polymeric material or a ceramic material by way of non-limiting examples.

The second mounting ring 128 is similar to first mounting ring 124, is arranged along the assembly axis 116, and is additionally axially stacked with the first mounting ring 124. In this respect the second mounting ring 128 extends about the assembly axis 116, is axially stacked between first mounting ring insulator 126 and the second mounting ring insulator 130, and also receives the A-phase bus bar 110, the B-phase bus bar 112, and the C-phase bus bar 114. As shown in FIG. 3, the second mounting ring 128 defines a plurality of radially extending second mounting ring diode seats 156 that seat therein the second diodes 104. The second mounting ring 128 receives the transfer tube 148 and extends about the transfer tube 148 such that the transfer tube 148 can fluidly communicate with the interior 154 of the rectifier assembly 100. It is contemplated that the second mounting ring 128 also be formed from an electrically conductive material.

The second mounting ring insulator 130 is arranged along the assembly axis 116 and is axially stacked with the second mounting ring 128. More specifically, the second mounting ring insulator 130 extends about the assembly axis 116 and is axially stacked between the second mounting ring 128 and the base plate 132. As shown in FIG. 3, the second mounting ring insulator 130 supports the AC bus bars, i.e., the A-phase bus bar 110, the B-phase bus bar 112, and the C-phase bus bar 114.

As shown in FIG. 4, the second mounting ring insulator 130 contains an insert 140. The insert 140 is similar to the insert 158 and receives therein a fastener 142. The fastener 142 in turn fixes a bus bar segment 110B of the A-phase bus bar 110 to the second mounting ring insulator 130, compressively fixing the second diode 104 within the second mounting ring diode seat 156 defined by the second mounting ring 128. It is also contemplated that the second mounting ring insulator 130 be formed from an electrically insulating material, such as a polymeric material or a ceramic material by way of non-limiting example.

With reference to FIGS. 3 and 4, the transfer tube 148 extends along the assembly axis 116 and axially spans the AC housing 118 and the base plate 132. The A-phase terminal 134 is electrically connected to the A-phase bus bar 110, e.g., via a fastener and a Bellville washer, and is further electrically connected to the source DC pin 106 and the and return DC pin 108 through the first mounting ring 124 and the second mounting ring 128. More specifically, the A-phase terminal 134 is electrically connected to the source DC pin 106 and the return DC pin 108 through the first diodes 102 and the second diodes 104 seated in the first mounting ring 124 and the second mounting ring 128, respectively. In this respect the bus bars electrically connect the diodes to the AC terminals to define the rectifier circuit 32 (shown in FIG. 1).

The source DC pin 106 extends axially along the assembly axis 116, is radially offset from the assembly axis 116, and extends through pin apertures within the first mounting ring 124 and the second mounting ring 128. It is contemplated that the source DC pin 106 and the return DC pin 108 each span the first mounting ring insulator 126 and the second mounting ring insulator 130 at locations radially outward of the fasteners seated in the inserts contained in the first mounting ring insulator 126 and the second mounting ring insulator 130, e.g., radially outward of the fastener 160. A retaining nut 166 extends circumferentially about the transfer tube 148 on a side of the DC housing 150 axially opposite the AC housing 118 to fluidly seal the AC housing 118 against the DC housing 150 such that lubricant 26 (shown in FIG. 1) introduced into the interior 154 flows radially from the transfer tube 148 to exit orifices defined through the DC housing 150, the lubricant 26 thereby removing heat from heat-generating elements of the rectifier circuit 32 (shown in FIG. 1).

Figure 5:
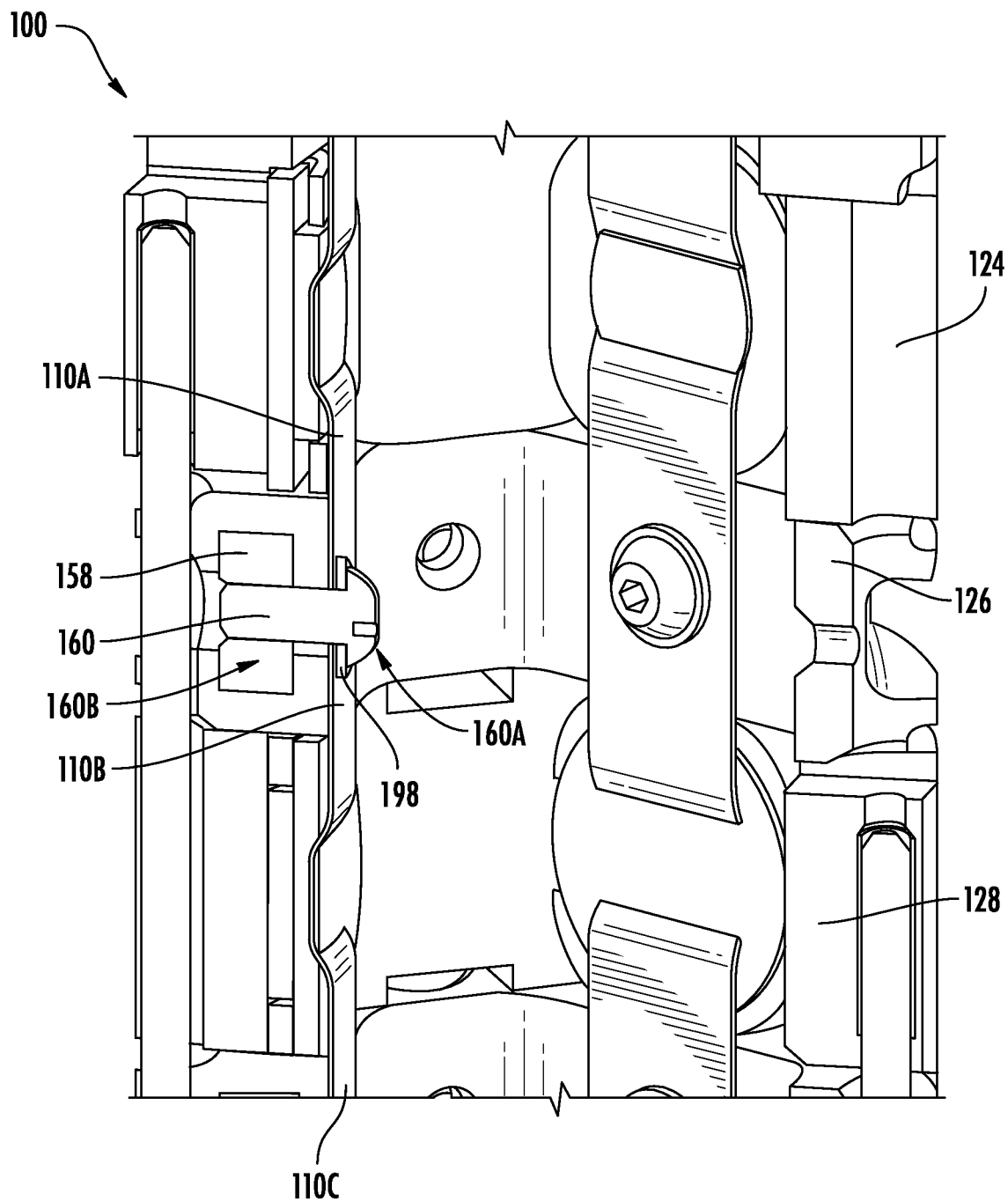
FIG. 5 is cross-sectional view of the rectifier assembly of FIG. 1, showing a fastener threadedly received within an insert and fixing a bus bar to the first mounting ring insulator.

With reference to FIG. 5, the fastener 160 has a head portion 160A and an opposite shank portion 160B. The head portion 160A of the fastener 160 is arranged on a side of the A-phase bus bar 110 radially inward of the radially outermost inner surface 182 (shown in FIG. 8) of the first mounting ring insulator 126. It is contemplated that an insulator body 198 can extends about the shank portion 160B the fastener 160 and be interposed between the A-phase bus bar 110 the head portion 160A of the fastener 160.

The shank portion 160B of the fastener 160 extends through the A-phase bus bar 110, is threadedly received within the insert 158, and terminates at a location radially inward of a radially innermost outer surface 180 of the first mounting ring insulator 126. In this respect the fastener 160 is arranged radially within the radially innermost outer surface 180 of the first mounting ring insulator 126. As will be appreciated by those of skill in the art, this increases dielectric separation between the fastener 160 and the source DC pin 106 radially outward of the insert 158 by limiting electrical communication between the source DC pin 106 the phase terminals, i.e., the A-phase terminal 134, the B-phase terminal 136, and the C-phase terminal 138, to electrical communication through the first diodes 102 and the second diodes 104 of the rectifier circuit 32 (shown in FIG. 1).

With reference to FIGS. 5-8, a portion of the rectifier assembly 100 including the first mounting ring 124, the first mounting ring insulator 126, and the second mounting ring 128 is shown. The first mounting ring insulator 126 contains the insert 158. The insert 158 fixes the A-phase bus bar 110 to the first mounting ring insulator 126 and compressively fixes the first diode 102 within the first mounting ring 124. Fixation of the A-phase bus bar 110 is accomplished by threaded engagement of the fastener 160 within the insert 158. Compressive fixation of the first diode 102 within the first mounting ring 124 is accomplished by an arcuate circumferential profile of the A-phase bus bar segment 110A, which the fastener 160 deforms to urge the first diode 102 radially outward and against the first mounting ring diode seat 152 defined within the first mounting ring 124.

Figure 7:
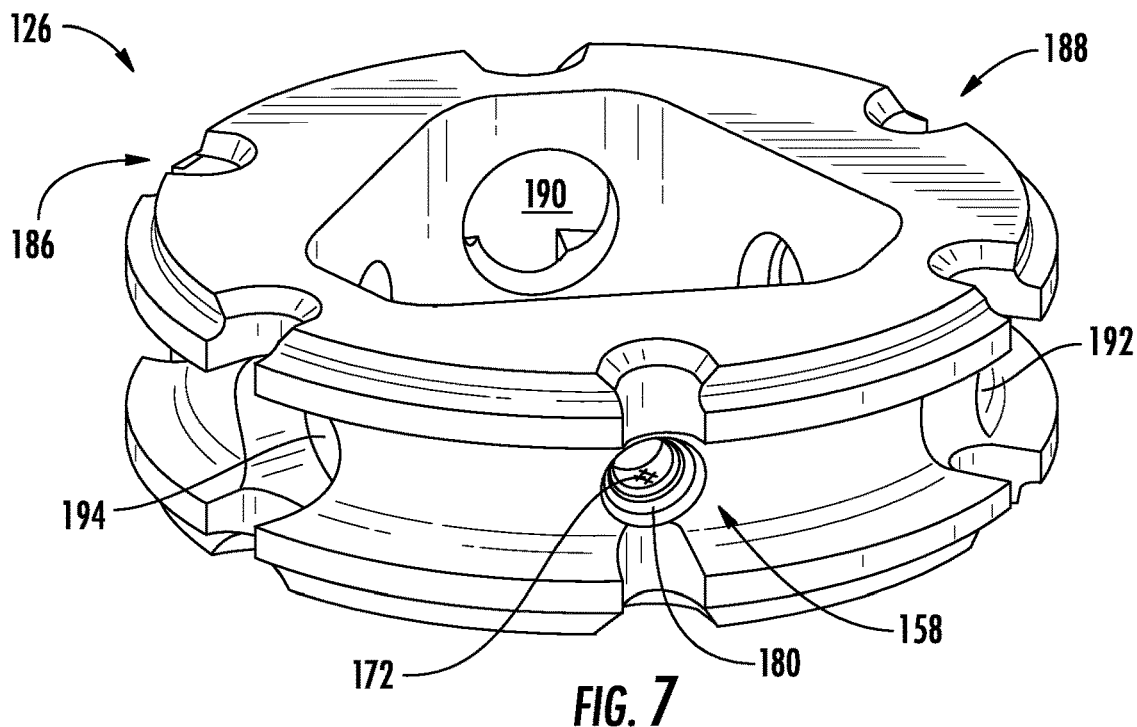
FIG. 7 is a perspective view of a mounting ring insulator for the rectifier assembly of FIG. 1, showing inserts and tool apertures distributed about the circumference of the mounting ring insulator.
Figure 8:
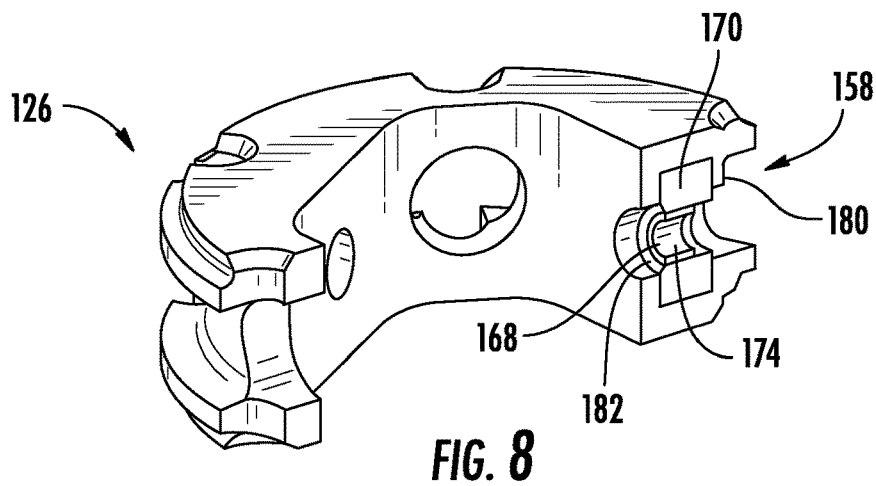
FIG. 8 is a cross-sectional view of a mounting ring insulator for the rectifier assembly of FIG. 1, showing an inset including a female threaded body fixed within the intermediate annulus contained within the mounting ring insulator.
Figure 9:
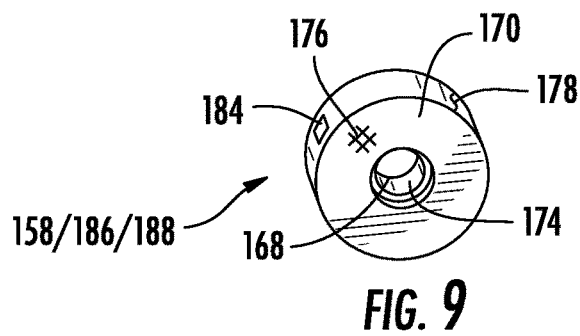
FIG. 9 is a perspective view of an insert for the mounting ring insulator of the rectifier assembly of FIG. 1, showing an engagement surface with a molding feature for fixation of the insert within the mounting ring insulator.

As shown in FIGS. 7-9, the insert 158 has a female threaded body 168. The female threaded body 168 is arranged within an intermediate annulus 170 insert 158, is formed from a metallic material 172 (e.g., brass), and defines therethrough a female threaded segment 174. The female threaded segment 174 is in turn arranged to threadedly receive therethrough a fastener, e.g., the fastener 160, for fixation of a bus bar, e.g., the bus bar 110, to the first mounting ring insulator 126.

In certain examples the intermediate annulus 170 be formed from a metallic material 176, such as steel, suitable for threadably fixing the female threaded body 168 and providing structural support the first mounting ring insulator 126 and the second mounting ring insulator 130 during operation. In accordance with certain examples the intermediate annulus 170 has an outer surface 178 defining an engagement feature 184 that fixes the insert 158 within an interior of the first mounting ring insulator 126. In accordance with certain examples the first mounting ring insulator 126 with the insert 158 contained therein is formed using an injection molding technique, the engagement feature 184 locking the intermediate annulus 170 within polymeric material introduced about the insert 158 during formation of the first mounting ring insulator 126.

As shown in FIGS. 7 and 8, the first mounting ring insulator 126 has a radially innermost outer surface 180 and a radially outermost inner surface 182. As shown in FIG. 8, the insert 158 is contained with the first mounting ring insulator 126 between the radially innermost outer surface 180 and the radially outermost inner surface 182 of the first mounting ring insulator 126. As will be appreciated by those of skill in the art in view of the present disclosure, arranging the insert 158 within the first mounting ring insulator 126 eliminates the need to manipulate the insert 158 independently of the first mounting ring insulator 126 during assembly of the rectifier assembly 100 (shown in FIG. 1), both reducing parts count and simplifying assembly of the rectifier assembly 100. As will also be appreciated by those of skill in the art in view of the present disclosure, arranging the insert 158 between the radially innermost outer surface 180 and the radially outermost inner surface 182 of the first mounting ring insulator 126 provides a relatively large dielectric separation between the fastener 160, which is seated in the A-phase bus bar 110 and carries AC power, and the source DC pin 106 arranged radially outward of the insert 158.

It is contemplated that the insert 158 be a first insert 158 and that the first mounting ring insulator 126 contain a second insert 186 and a third insert 188. The second insert 186 and the third insert 188 are similar to the first insert 158 and are additionally contained within the first mounting ring insulator 126 at locations circumferentially offset from the first insert 158. In this respect the second insert 186 is circumferentially offset from the first insert 158 by about 120-degrees about the assembly axis 116, and the third insert 188 is circumferentially offset from the first insert 158 by about 120-degrees about the assembly axis 116 is a direction circumferentially opposite that of the second insert 186. As will be appreciated by those of skill in the art in view of the present disclosure, offsetting the second insert 186 and the third insert 188 from the first insert 158 maximizes spatial separation of the A-phase bus bar 110, the B-phase bus bar 112, and the C-phase bus bar 114 within the interior 154 (shown in FIG. 3) of the rectifier assembly 100 (shown in FIG. 1). Maximizing spatial separation in turn allows the rectifier assembly 100 to carry relatively large excitation currents for a given size or be smaller than otherwise possible for a given excitation current rating.

As also shown in FIGS. 7 and 8, it is contemplated that the first mounting ring insulator 126 define a tool aperture 190. The tool aperture 190 extends radially through the first mounting ring insulator 126 and is circumferentially offset from the insert 158 by about 180-degrees. So offset the tool aperture allows the fastener 160 (shown FIG. 3) to be installed from the interior 154 (shown in FIG. 3) of the rectifier assembly 100, e.g., by allowing a tool to enter the interior 154 and threadedly seat the fastener 160 in the insert 158. In the illustrated example the tool aperture 190 is a first tool aperture 190 and the first mounting ring insulator 126 defines a second tool aperture 192 and a third tool aperture 194. The second tool aperture 192 is circumferentially offset from the first tool aperture 190 by about 120-degrees and the third tool aperture 194 is circumferentially offset from the first tool aperture 190 by about 120-degrees in a circumferentially opposite direction.

As shown and described herein as having fasteners with radially inner fastener heads and radially outer fastener shanks, it is to be understood and appreciated that rectifier assemblies having radially inner shanks and radially outer fastener heads can also benefit from the present disclosure. Further, although shown and described herein as having inserts contained within annular insulators, rotating rectifier assemblies having fasteners with fastener heads contained within insulator structures and receiving thereon keeper nuts to secure bus bars to the insulator structure can also benefit from the present disclosure.

Figure 10:
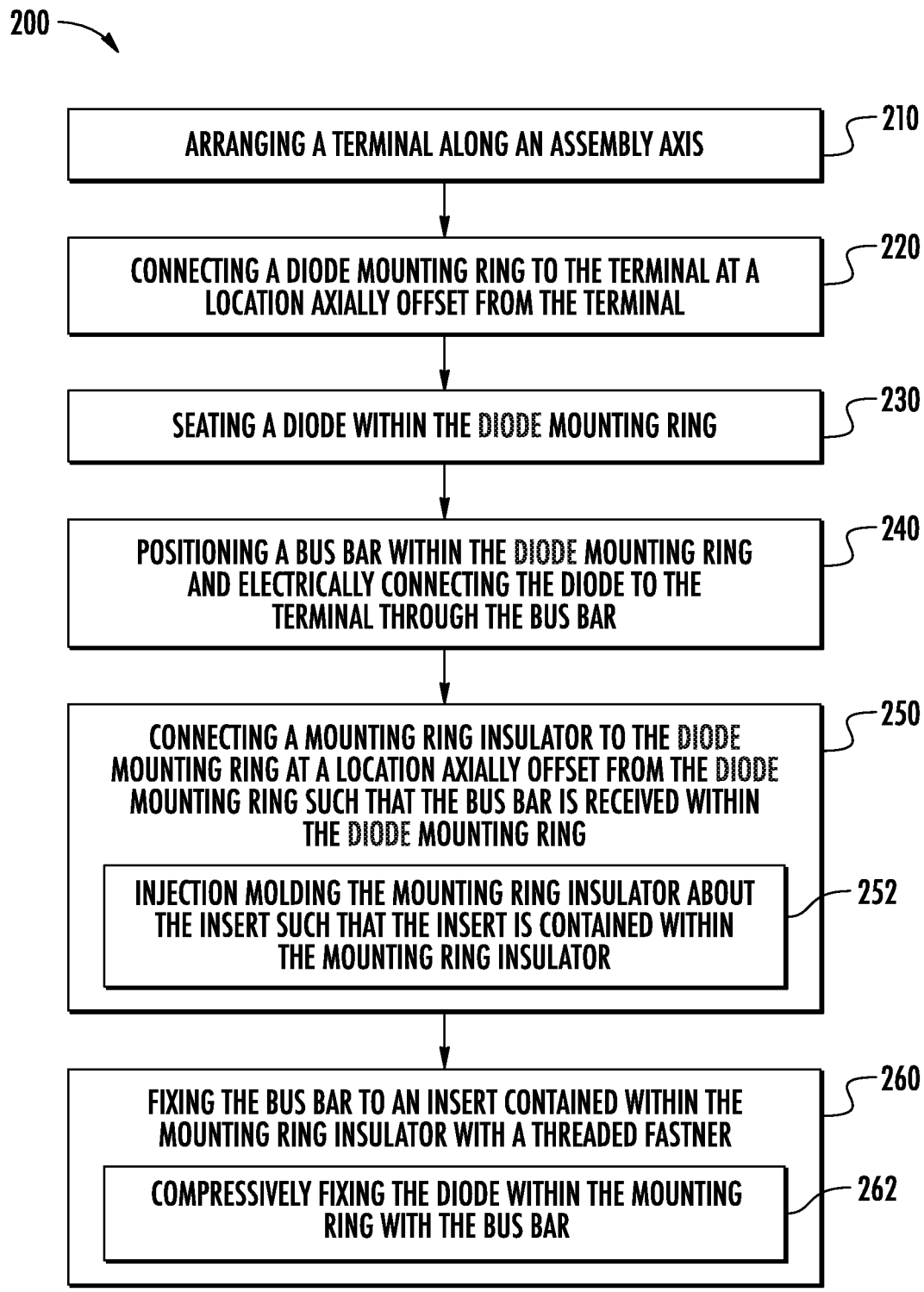
FIG. 10 is block diagram of a method of making a rectifier assembly, showing steps of the method according to an illustrative and non-limiting example of the method.

With reference to FIG. 10, a method of making a rectifier assembly, e.g., the rectifier assembly 100 (shown in FIG. 1), 100 is shown. The method 200 includes arranging a terminal along an assembly axis, e.g., the A-phase terminal 134 (shown in FIG. 2) along the assembly axis 116 (shown in FIG. 2), as shown with box 210. A mounting ring, e.g., the first mounting ring 124 (shown in FIG. 2), is connected to the terminal at a location axially offset from the terminal, as shown with box 220. A diode, e.g., the first diode 102 (shown in FIG. 3), is seated within the mounting ring, as shown with box 230. A bus bar, e.g., the A-phase bus bar 110 (shown in FIG. 3), is positioned within the mounting ring and electrically connected between the terminal and the diode to electrically connect the diode to the terminal, as shown with box 240.

As shown with box 250, a mounting ring insulator, e.g., the first mounting ring insulator 126 (shown in FIG. 2), is connected to the mounting ring at a location axially offset from the mounting ring such that the bus bar is received within the mounting ring insulator. The bus bar is then fixed to an insert, e.g., the insert 158 (shown in FIG. 4), contained within the mounting ring insulator, as shown with box 260. It is contemplated that the mounting ring insulator can be molded, e.g., injection molded, about the insert such that the insert is contained within the within the mounting ring insulator, as shown with box 252. It is also contemplated that the fixation of the bus bar to the insert contained within the mounting ring insulator compressively fix the diode within the mounting ring, as shown with box 262.

Rotating rectifiers commonly include source and return bus bars. The source and return bus bars require both structural support and electrical isolation from one another. Electrical isolation is generally provided by positioning the source and return bus bars on radially opposite sides of mounting rings and mounting ring insulators, the mounting rings and mounting ring insulators in turn axially stacked along the rotation axis of the rotating rectifier. Structural support is typically provided by fasteners, which secure the source and return bus bars on radially opposite sides of the mounting ring insulators and are received in axially alternating mounting ring insulators. Keeper nuts threadedly received on shanks of the fasteners protruding from the mounting ring insulators secure the fasteners, and thereby the bus bars, to the mounting ring insulators at locations radially opposite the bus bar.

While generally acceptable for its intended purpose, such arrangements require electrical isolation between the keeper nut and the bus bar arranged radially opposite the bus bar secured by the fastener. The electrical isolation is typically required by spacing the keeper nut from the bus bar arranged radially opposite the bus bar secured by the fastener. The spacing in turn is sized to provide clearance sufficient for the required electrical separation, a portion of which can be provided by a creepage gap defined by the mounting ring insulator.

In examples described herein annular mounting ring insulators contain one or more insert, such as by co-molding the mounting ring insulator about the one or more insert. The one or more insert defines therein (or therethrough) a female threaded aperture, which is exposed to the exterior of the insulator. The exposed female threaded apertures receive then fastener securing the bus bar to the annular insulator. Advantageously, since the insert is contained within the mounting ring insulator (and not located on the exterior of the annular insulator), the shank of the fastener can be relatively short, e.g., not radially span the annular insulator. Being relatively short, spacing between the fastener and the bus bar arranged on a side of the mounting ring insulator radially opposite the fastener can be relatively large, increasing the electrical separation between the fastener and the bus bar. Alternatively, the bus bar radially opposite the fastener can be positioned relatively close to the mounting ring insulator, allowing the rotating rectifier to be relatively radially compact.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rectifier assembly, comprising:
   a terminal arranged along an assembly axis;
   a mounting ring axially offset from the terminal and seating a diode;
   a bus bar received within the mounting ring and electrically connecting the diode to the terminal through the bus bar; and
   a mounting ring insulator receiving the bus bar and axially offset from the mounting ring, wherein the mounting ring insulator contains an insert,
   wherein the insert fixes the bus bar to the mounting ring insulator and compressively fixes the diode within the mounting ring,
   wherein the insert defines an intermediate annulus with a cylindrical outer surface and a female threaded body arranged therein, the mounting ring insulator has a radially innermost outer surface and a radially outermost inner surface, and the mounting ring insulator is injection molded about the insert so that the insert is contained between the radially innermost outer surface and the radially outermost inner surface.

2. The rectifier assembly of claim 1, wherein the insert has a female threaded body arranged within an intermediate annulus.

3. The rectifier assembly of claim 2, wherein the female threaded body is formed from a metallic material and defines a female threaded segment arranged to threadedly receive therethrough a fastener.

4. The rectifier assembly of claim 2, wherein the intermediate annulus is formed from a metallic material.

5. The rectifier assembly of claim 1, wherein the mounting ring insulator defines a tool aperture therethrough, wherein the tool aperture is circumferentially offset from the insert about the assembly axis by about 180-degrees.

6. The rectifier assembly of claim 5, wherein the tool aperture extends between axially adjacent planar bus seat surfaces, the planar bus seat surfaces tangent to a circle extending about the assembly axis.

7. The rectifier assembly of claim 5, wherein the tool aperture is a first tool aperture and the mounting ring insulator define therethrough a second tool aperture and a third tool aperture, the second tool aperture circumferentially offset from the first tool aperture by about 120-degrees, the third tool aperture circumferentially offset from the first tool aperture by about 120-degrees.

8. The rectifier assembly of claim 1, wherein the insert is a first insert and the mounting ring insulator contains within its interior a second insert and a third insert, the second insert circumferentially offset from the first insert by 120-degrees, the third insert circumferentially offset from the first insert by 120-degrees.

9. The rectifier assembly of claim 1, further comprising a fastener with a head portion and an opposite shank portion, the shank portion extending through the bus bar, the shank portion threadedly received within the insert, and the shank portion terminating at a location radially inward of a radially outer surface of the mounting ring insulator.

10. The rectifier assembly of claim 9, wherein the head portion of the fastener is arranged on a side of the bus bar radially inward of a radially outermost inner surface of the mounting ring insulator.

11. The rectifier assembly of claim 9, further comprising an insulator body extending about the shank portion of the fastener and interposed between the bus bar and the head portion of the fastener.

12. The rectifier assembly of claim 9, further comprising a direct current pin electrically connected to the terminal by the diode, the direct current pin arranged radially outward of the insert and radially separated from the assembly axis by the fastener and the bus bar.

13. The rectifier assembly of claim 1, further comprising a fastener recessed within a radially innermost outer surface of the mounting ring insulator.

14. A generator, comprising:
   a stator supporting a stator main coil;
   a rotor carrying a rectifier assembly as recited in claim 1 and supported for rotation about a rotation axis, wherein the mounting ring insulator has a radially innermost outer surface and a radially outermost inner surface, wherein the insert is contained between the radially innermost outer surface and the radially outermost inner surface; and
   a fastener recessed within a radially innermost outer surface of the mounting ring insulator.

15. The generator of claim 14, wherein the insert is a first insert and the mounting ring insulator contains within its interior a second insert and a third insert, the second insert circumferentially offset from the first insert by 120-degrees, the third insert circumferentially offset from the first insert by 120-degrees; and wherein the mounting ring insulator defines a tool aperture therethrough, wherein the tool aperture is circumferentially offset from the insert about the assembly axis by about 180-degrees.

16. The generator of claim 14, wherein the insert has a female threaded body arranged within an intermediate annulus; and wherein the fastener has a head portion and an opposite shank portion, the shank portion extending through the bus bar, the shank portion threadedly received within the insert, and the shank portion terminating at a location radially inward of a radially innermost outer surface of the mounting ring insulator.

17. The generator of claim 14, further comprising a direct current pin electrically connected to the terminal by the diode, the direct current pin arranged radially outward of the insert and radially separated from the assembly axis by the fastener and the bus bar.

18. A method of making a rectifier assembly, comprising:

arranging a terminal along an assembly axis;

connecting a mounting ring to the terminal at a location axially offset from the terminal;

seating a diode within the mounting ring;

positioning a bus bar within the mounting ring and electrically connecting the diode to the terminal through the bus bar;

connecting a mounting ring insulator to the mounting ring at a location axially offset from the mounting ring such that the bus bar is received within the mounting ring; and fixing the bus bar to an insert contained within the mounting ring insulator, wherein fixing the bus bar to the insert compressively fixes the diode within the mounting ring, and wherein the insert defines an intermediate annulus with a cylindrical outer surface and a female threaded body arranged therein, the mounting ring insulator has a radially innermost outer surface and a radially outermost inner surface, and the mounting ring insulator is injection molded about the insert so that the insert is contained between the radially innermost outer surface and the radially outermost inner surface.

* * * * *